US007702596B2

(12) United States Patent
Tu et al.

(10) Patent No.: US 7,702,596 B2
(45) Date of Patent: Apr. 20, 2010

(54) PROBABILISTIC BOOSTING TREE FRAMEWORK FOR LEARNING DISCRIMINATIVE MODELS (75) Inventors: Zhuowen Tu, San Diego, CA (US); Adrian Barbu, Tallahassee, FL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 12/180,696

(22) Filed: Jul. 28, 2008

(65) Prior Publication Data
US 2008/0285862 A1 Nov. 20, 2008

Related U.S. Application Data (62) Division of application No. 11/366,722, filed on Mar. 2, 2006, now abandoned.

(60) Provisional application No. 60/660,136, filed on Mar. 9, 2005.

(51) Int. Cl.
G06F 15/18 (2006.01)

(52) U.S. Cl. .............................. 706/20; 706/12; 706/14; 706/15; 706/16; 706/21; 382/155; 382/156; 382/157; 382/158; 382/159; 382/190

(58) Field of Classification Search ................... 706/12, 706/14, 15–22; 382/100, 108, 115–118, 382/124, 128–134, 155–161, 190–192, 203
See application file for complete search history.

(56) References Cited

U.S. PATENT DOCUMENTS 6,546,379 B1 * 4/2003 Hong et al. .................... 706/14
7,203,669 B2 * 4/2007 Lienhart et al. ............... 706/48

2005/0018890 A1 * 1/2005 McDonald et al. .......... 382/128

OTHER PUBLICATIONS

Viola et al. "Rapid Object Detection Using a Boosted Cascade of Simple Features", IEEE, 2001, pp. 511-518.*
Viola et al. "Robust Real-Time Object Detection", 2001, pp. 1-25.*
Ong et al. "A Boosted Classifier Tree for Hand Shape Detection", 2004, pp. 1-6.*
Lienhart et al. "Empirical Analysis of Detection Cascades of Boosted Classifiers for Rapid Object Detection", 2003, pp. 1-8.*

(Continued)

Primary Examiner—Donald Sparks
Assistant Examiner—Omar F Fernandez Rivas (57) ABSTRACT A probabilistic boosting tree framework for computing two-class and multi-class discriminative models is disclosed. In the learning stage, the probabilistic boosting tree (PBT) automatically constructs a tree in which each node combines a number of weak classifiers (e.g., evidence, knowledge) into a strong classifier or conditional posterior probability. The PBT approaches the target posterior distribution by data augmentation (e.g., tree expansion) through a divide-and-conquer strategy. In the testing stage, the conditional probability is computed at each tree node based on the learned classifier which guides the probability propagation in its sub-trees. The top node of the tree therefore outputs the overall posterior probability by integrating the probabilities gathered from its sub-trees. In the training stage, a tree is recursively constructed in which each tree node is a strong classifier. The input training set is divided into two new sets, left and right ones, according to the learned classifier. Each set is then used to train the left and right sub-trees recursively.

12 Claims, 11 Drawing Sheets

OTHER PUBLICATIONS

Pujol et al. "Intravascular Ultrasound Images Vessel Characterization Using AdaBoost" 2003, pp. 242-251.*

Lienhart et al. "A Detector Tree of Boosted Classifiers for Real-Time Object Detection and Tracking", IEEE, 2003, pp. 277-280.*

* cited by examiner

TO TRAIN A TREE OF MAXIMUM DEPTH OF L:
- GIVEN: A TRAINING SET $S = \{(x_1, y_1, w_1), ..., (x_m, y_m, w_m)\}; x_i \in X, y_i \in \{-1, +1\}, \sum_i w_i = 1$.
- COMPUTE THE EMPIRICAL DISTRIBUTION $\hat{q}(y) = \sum_i w_i d(y_i = y)$.
- ON TRAINING SET S, TRAIN A STRONG CLASSIFIER USING A BOOSTING ALGORITHM WITH T WEAK CLASSIFIERS BUT EXIT EARLY IF $\hat{I}_t > q$, e.g. $q = 0.45$.
- IF THE CURRENT TREE DEPTH IS L THEN EXITS.
- INITIALIZE TWO EMPTY SETS $S_{LEFT}$ AND $S_{RIGHT}$.
- FOR EACH SAMPLE $(x_i, y_i)$, COMPUTE THE PROBABILITY $q(+1|x_i)$ AND $q(-1|x_i)$ USING THE LEARNED STRONG CLASSIFIER.
- IF $q(+1|x_i) - 1/2 > e$ THEN $(x_i, y_i, 1) \in S_{RIGHT}$
  ELSE IF $q(-1|x_i) - 1/2 > e$ THEN $(x_i, y_i, 1) \in S_{LEFT}$
        ELSE $(x_i, y_i, q(+1|x_i)) \in S_{RIGHT}$ AND $(x_i, y_i, q(-1|x_i)) \in S_{LEFT}$.
- NORMALIZE ALL THE WEIGHTS OF THE SAMPLES IN $S_{LEFT}$.
- REPEAT THE PROCEDURE RECURSIVELY.
- NORMALIZE ALL THE WEIGHTS OF THE SAMPLES IN $S_{RIGHT}$.
- REPEAT THE PROCEDURE RECURSIVELY.

FUNCTION $F_N(x,y)$: TO COMPUTE POSTERIOR DISTRIBUTION $\tilde{P}_N(y|x)$ AT TREE NODE N.

- FOR A GIVEN SAMPLE x, COMPUTE $q_N(+1|x)$ AND $q_N(-1|x)$ USING THE LEARNED BOOSTING MODEL AT THE CURRENT TREE NODE N.

- $\tilde{P}_N(y|x) = q(+1|x)\tilde{P}_{RIGHT}(y) + q(-1|x)\tilde{P}_{LEFT}(y)$ IN WHICH $\tilde{P}_{RIGHT}(y)$ AND $\tilde{P}_{LEFT}(y)$ ARE COMPUTED BELOW.

- IF $q(+1|x) - 1/2 > e$ THEN
    $\tilde{P}_{RIGHT}(y) = F_{RIGHT(N)}(x, y)$, AND
    $\tilde{P}_{LEFT}(y) = \hat{q}_{LEFT(N)}(y)$.
  ELSE IF $q(y+1|x) - 1/2 > e$ THEN
    $\tilde{P}_{RIGHT}(y) = \hat{q}_{RIGHT}(y)$, AND $\tilde{P}_{LEFT} = F_{LEFT(N)}(x,y)$.
    ELSE
    $\tilde{P}_{RIGHT}(y) = F_{RIGHT(N)}(x,y)$, AND
    $\tilde{P}_{LEFT}(y) = F_{LEFT(N)}(x,y)$.

TO TRAIN A TREE OF MAXIMUM DEPTH OF L:

- GIVEN: A TRAINING SET $S = \{(x_1, y_1, w_1), ..., (x_m, y_m, w_m); x_i \in X, y_i \in \{1, ..., n\}\}$, $\sum_i w_i = 1$.
- COMPUTE THE EMPIRICAL DISTRIBUTION $\hat{q}(y) = \sum_i w_i d(y_i = y)$.
- FOR EACH FEATURE $h_j$ AT VALUE $v_j$, COMPUTE THE HISTOGRAM
  $HIS_{LEFT}(k) = 1/Z_{LEFT} \sum_i d(k = y_i) w_i$ FOR $y_i < v_j$ AND
  $HIS_{RIGHT}(k) = 1/Z_{RIGHT} \sum_i d(k = y_i) w_i$ FOR $y_i \geq v_j$
- FIND THE OPTIMAL $h_j$ AND $v_j$ THAT ACHIEVE THE MINIMUM ENTROPY
  $Z_{LEFT} ENTROPY(HIS_{LEFT}) + Z_{RIGHT} ENTROPY(HIS_{RIGHT})$.
- CREATE A NEW SET $S' = \{(x_1, y'_1, w_1), ..., (x_m, y'_m, w_m); x_i \in X, y_i \in \{-1, +1\}$
- $y'_i = -1$ IF $Z_{LEFT} HIS_{LEFT}(y_i) \geq Z_{RIGHT} HIS_{RIGHT}(y_i)$ AND $y'_i = +1$ OTHERWISE. (A SAMPLING STRATEGY CAN BE ADOPTED ALSO.)
- NOW IT BECOMES A TWO-CLASS LEARNING PROBLEM. FOLLOW THE SAME PROCEDURE AS IN FIG.2
- REPEAT THE PROCEDURE.

PROBABILISTIC BOOSTING TREE FRAMEWORK FOR LEARNING DISCRIMINATIVE MODELS

CROSS REFERENCE TO RELATED APPLICATION

This application claims the benefit of U.S. Provisional Application Ser. No. 60/660,136, filed on Mar. 9, 2005, which is incorporated by reference in its entirety.

This application is a divisional of co-pending U.S. patent application Ser. No. 11/366,722, filed Mar. 2, 2006.

FIELD OF THE INVENTION

The present invention is directed to a probabilistic boosting tree framework for learning discriminative models, and more particularly, to a probabilistic boosting tree framework for computing two class and multi-class discriminative models.

BACKGROUND OF THE INVENTION

Figure 1:
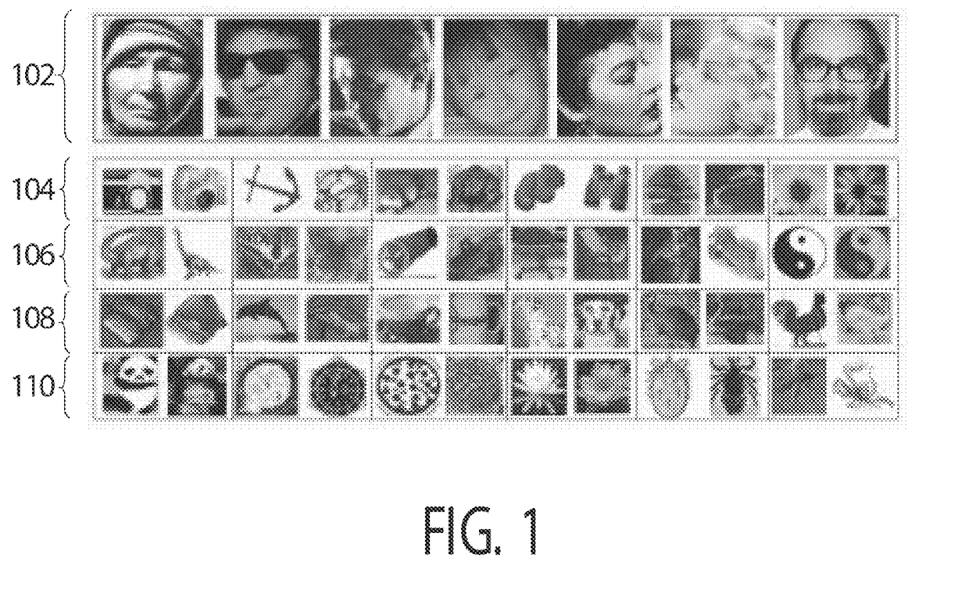
FIG. 1 illustrates examples of images of natural scenes and common objects.

The task of classifying/recognizing, detecting and clustering general objects in natural scenes is extremely challenging. The difficulty is due to many reasons: large intra-class variation and inter-class similarity, articulation and motion, different lighting conditions, orientations/viewing directions, and the complex configurations of different objects. FIG. 1 shows a multitude of different images. The first row 102 of FIG. 1 displays some face images. The rest of the rows 104-110 show some typical images from the Caltech 101 categories of objects. Some of the objects are highly non-rigid and some of the objects in the same category bear little similarity to each other. For the categorization task, very high level knowledge is required to put different instances of a class into the same category.

The problem of general scene understanding can be viewed in two aspects: modeling and computing. Modeling addresses the problem of how to learn/define the statistics of general patterns/objects. Computing tackles the inference problem. Let x be an image sample and its interpretation be y. Ideally, the generative models $p(x|y)$ are obtained for a pattern to measure the statistics about any sample x. Unfortunately, not only are such generative models often out of reach, but they also create large computational burdens in the computing stage. For example, faces are considered a relatively easy class to study. Yet, there is no existing generative model which captures all the variations for a face such as multi-view, shadow, expression, occlusion, and hair style. Some sample faces can be seen in the first row 102 of FIG. 1. Alternatively, a discriminative model $p(y|x)$ is learned directly, in which y is just a simple variable to say, "yes" or "no", or a class label.

A known technique referred to as AdaBoost and its variants have been successfully applied in many problems in vision and machine learning. AdaBoost approaches the posterior $p(y|x)$ by selecting and combining a set of weak classifiers into a strong classifier. However, there are several problems with the current AdaBoost method. First, though it asymptotically converges to the target distribution, it may need to pick hundreds of weak classifiers. This poses a huge computational burden. Second, the order in which features are picked in the training stage is not preserved. The order of a set of features may correspond to high-level semantics and, thus, it is very important for the understanding of objects/patters. Third, the re-weighing scheme of AdaBoost may cause samples previously correctly classified to be misclassified again. Fourth, though extensions from two-class to multi-class classification have been proposed, learning weak classifiers in the multi-class case using output coding is more difficult and computationally expensive.

Another known method typically referred to as AdaTree combines AdaBoost with a decision tree. The main goal of the AdaTree method is to speed up the AdaBoost method by pruning. The AdaTree method learns a strong classifier by combining a set of weak classifiers into a tree structure, but it does not address multi-class classification.

A number of approaches exist to handle object classification and detection. Cascade approaches that are used together with AdaBoost have shown to be effective in rare event detection. The cascade method can be viewed as a special case of the method of the present invention. In the cascade, a threshold is picked such that all the positive samples are pushed to the right side of the tree. However, pushing positives to the right side may cause a big false positive rate, especially when the positives and negatives are hard to separate. The method of the present invention naturally divides the training sets into two parts. In the case where there are many more negative samples than positive samples, most of the negatives are passed into leaf nodes close to the top. Deep tree leaves focus on classifying the positives and negatives which are hard to separate.

Decision trees have been widely used in vision and artificial intelligence. In a traditional decision tree, each node is a weak decision maker and thus the result at each node is more random. In contrast, in the present invention, each tree node is a strong decision maker and it learns a distribution $q(y|x)$. Other approaches include A*, generative models, EM and grammar and semantics. There is a need for a framework that is capable of learning discriminative models for use in multi-class classification that is not computationally burdensome.

SUMMARY OF THE INVENTION

The present invention is directed to a method for localization of an object in an image. A probabilistic boosting tree is constructed in which each node combines a number of weak classifiers into a strong classifier or conditional posterior probability. At least one input image containing the object to be localized is received. A bounding box in the input image is identified in which the object should reside based on the conditional posterior probability. A probability value for the bounding box is computed based on the likelihood that the object in fact resides in that location. Bounding boxes and probability values are determined for different locations in the input image. The bounding box with the highest computed probability is selected as the location where the object resides.

The present invention is also directed to a method for detecting an object in an image. A probabilistic boosting tree is constructed in which each node combines a number of weak classifiers into a strong classifier or conditional posterior probability. At least one input image is received. A bounding box in the at least one input image is identified in which the object may reside based on the conditional posterior probability. A probability value for the bounding box is computed based on the likelihood that the object resides in the image. The probability is compared to a predetermined threshold. The bounding box is maintained if the probability is above the predetermined threshold. Bounding boxes and probability values are determined for different locations in the input image. A determination is made as to whether the object resides in the image if the probability for at least one bounding box is above the predetermined threshold.

The present invention is also directed to a method of classifying images of objects into different image categories. A probabilistic boosting tree is recursively constructed in which each tree node is a strong classifier. A discriminative model is obtained at the top of the tree and each level of the tree comprises an augmented variable. An input training set is divided into two new sets according to a learned classifier. The two new sets are used to train a left and right sub-trees recursively such that clustering is automatically formed in a hierarchical way. An appropriate number of classifications are outputted based on a number of clusters formed.

BRIEF DESCRIPTION OF THE DRAWINGS

Preferred embodiments of the present invention will be described below in more detail, wherein like reference numerals indicate like elements, with reference to the accompanying drawings:

FIG. 8 shows examples of face detection in accordance with the present invention.

DETAILED DESCRIPTION

The present invention is directed to a probabilistic boosting tree framework for computing two-class and multi-class discriminative models. In the learning stage, the probabilistic boosting tree (PBT) automatically constructs a tree in which each node combines a number of weak classifiers (e.g., evidence, knowledge) into a strong classifier or conditional posterior probability. The PBT approaches the target posterior distribution by data augmentation (e.g., tree expansion) through a divide-and-conquer strategy.

In the testing stage, the conditional probability is computed at each tree node based on the learned classifier which guides the probability propagation in its sub-trees. The top node of the tree therefore outputs the overall posterior probability by integrating the probabilities gathered from its sub-trees. Also, clustering is naturally embedded in the learning phase and each sub-tree represents a cluster of a certain level.

In the training stage, a tree is recursively constructed in which each tree node is a strong classifier. The input training set is divided into two new sets, left and right ones, according to the learned classifier. Each set is then used to train the left and right sub-trees recursively. The discriminative model obtained at the top of the tree approaches the target posterior distribution by data augmentation. Each level of the tree is an augmented variable. Clustering is intrinsically embedded in the learning stage with clusters automatically discovered and formed in a hierarchical way.

For the multi-class problem, the goal is to learn a discriminative model while keeping the hierarchical tree structure. This is done by treating the multi-class publication problem as a special two-class classification problem. At each node, either a positive or negative label is assigned to each class in minimizing the total entropy. Through this procedure, the multi-class and two-class learning procedures become unified. Clusters of multi-classes are again directly formed.

The general AdaBoost method and its variants learn a strong classifier by combining a set of weak classifiers $$H(x) = \sum_{t=1}^{T} \alpha_t h_t(x)$$

in which $h_t(x)$ is a weak classifier. The total error rate $\epsilon = \sum_i w_i [\text{sign}[H(x_i)] \neq y_i]$ is shown to be bounded by $$\varepsilon \leq 2^T \prod_{t=1}^{T} \sqrt{\varepsilon_t (1 - \varepsilon_t)}, \qquad (1)$$

where $w_i$ is the probability of sample $x_i$.

When dealing with $x_i$ arising from a complex distribution, $\epsilon_t$ quickly approaches 0.5, and the convergence becomes slow. One possible remedy lies in designing more effective weak classifiers that are better at separating the positives from the negatives. Unfortunately, it is often hard to obtain good weak classifiers and the computational complexity in computing these classifiers and features is yet another constraint. One of the key ideas in AdaBoost is that samples incorrectly classified receive more weights the following time. Due to the update rule and normalization for $D_t$ previously correctly classified samples may be misclassified again and thus receive a penalty. Therefore, after some steps, weak classifiers become ineffective. Instead of putting all the weak classifiers together into a single strong classifier, a divide-and-conquer approach is used instead.

Figure 2:
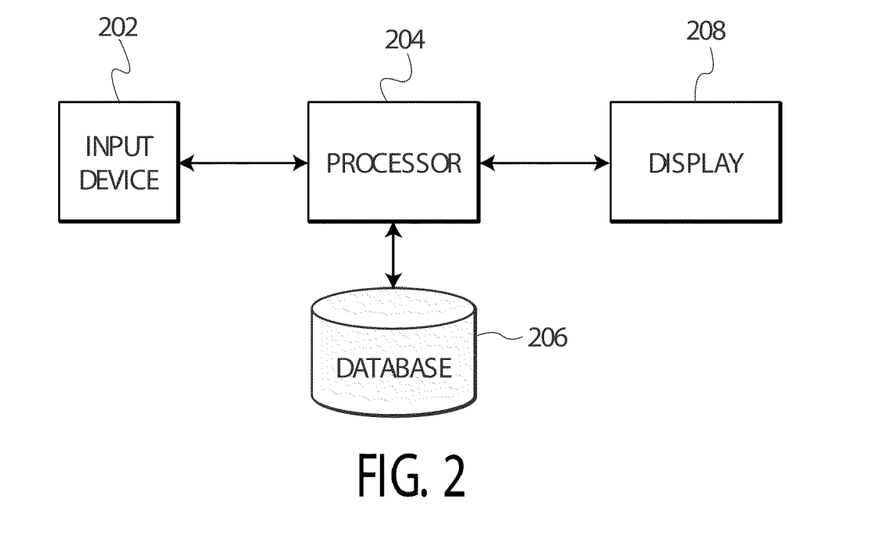
FIG. 2 is a block diagram of a system for implementing a probabilistic boosting tree in accordance with the present invention.

FIG. 2 illustrates a block diagram of a general system for implementing the probabilistic boosting tree framework in accordance with the present invention. One or more images are obtained using an input device 202 such as a camera. The images are received by a processor 204 which applies the PBT framework to the image. The PBT framework can be used to accomplish a number of tasks as will be described in greater detail hereinafter. For example, the PBT framework can be used for object categorization or object detection. Training samples that are stored in database 206 can be used to learn and compute discriminative models. The system takes the input images and outputs a classification result. In the case of a two class problem, the output is either positive or negative. In a multi-class problem, the class to which the image belongs is the output. The classification results are then shown on display 208

Figure 3:
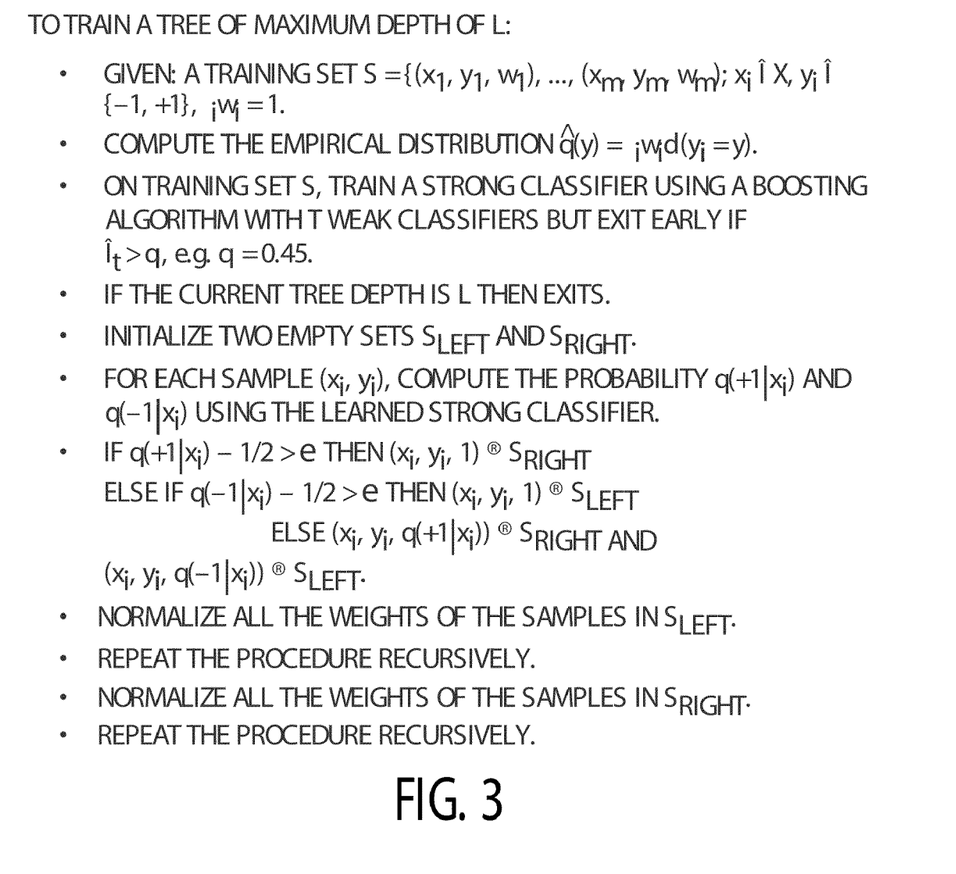
FIG. 3 outlines a method for training a boosting tree in accordance with the present invention.

FIG. 3 outlines a method for training a boosting tree in accordance with the present invention. For notational simplicity, the probabilities computed by each learned AdaBoost method are denoted as follows:

$$q(+1 \mid x) = \frac{\exp\{2H(x)\}}{1 + \exp\{2H(x)\}}. \quad (2)$$

and $$q(-1 \mid x) = \frac{\exp\{-2H(x)\}}{1 + \exp\{-2H(x)\}}.$$

The algorithm is intuitive. It recursively learns a tree. At each node, a strong classifier is learned using the standard boosting algorithm. The training samples are then divided into two new sets using the learned classifier, the left one and the right one, which are then used to train a left sub-tree and right sub-tree respectively. The variable $\epsilon$ is used to control., to some degree, the overfitting problem. Those samples falling in the range of $$\left[\frac{1}{2} - \varepsilon, \frac{1}{2} + \varepsilon\right]$$

are confusing ones and will be used in both the left and the right sub-trees for training. If $$\varepsilon = \frac{1}{2},$$

then all training samples are past into both the sub-trees with weights re-computed based on the strong classifier. PBT then becomes similar to boosting. If $\epsilon=0$, then each sample is past either into right or left tree. Therefore, positive and negative samples are almost sure to be separated, if there are no identical ones. But it may overfit the data.

If a training set is split into two parts, the new error rate is $$\epsilon_{split} = \sum_i w_i(l)[H_l(x_i) \neq y_i] + \sum_i w_i(r)[H_r(x_i) \neq y_i] \leq \epsilon_i, \quad (3)$$

Where $\epsilon = \sum_i w_i[H(x_i) \neq y_i]$.

It is straight forward to see that the equality holds when $H_l=H$ and $H_r=H$. In general, reducing the number of input samples reduces the complexity of the problem leading to a better decision boundary.

Figure 4:
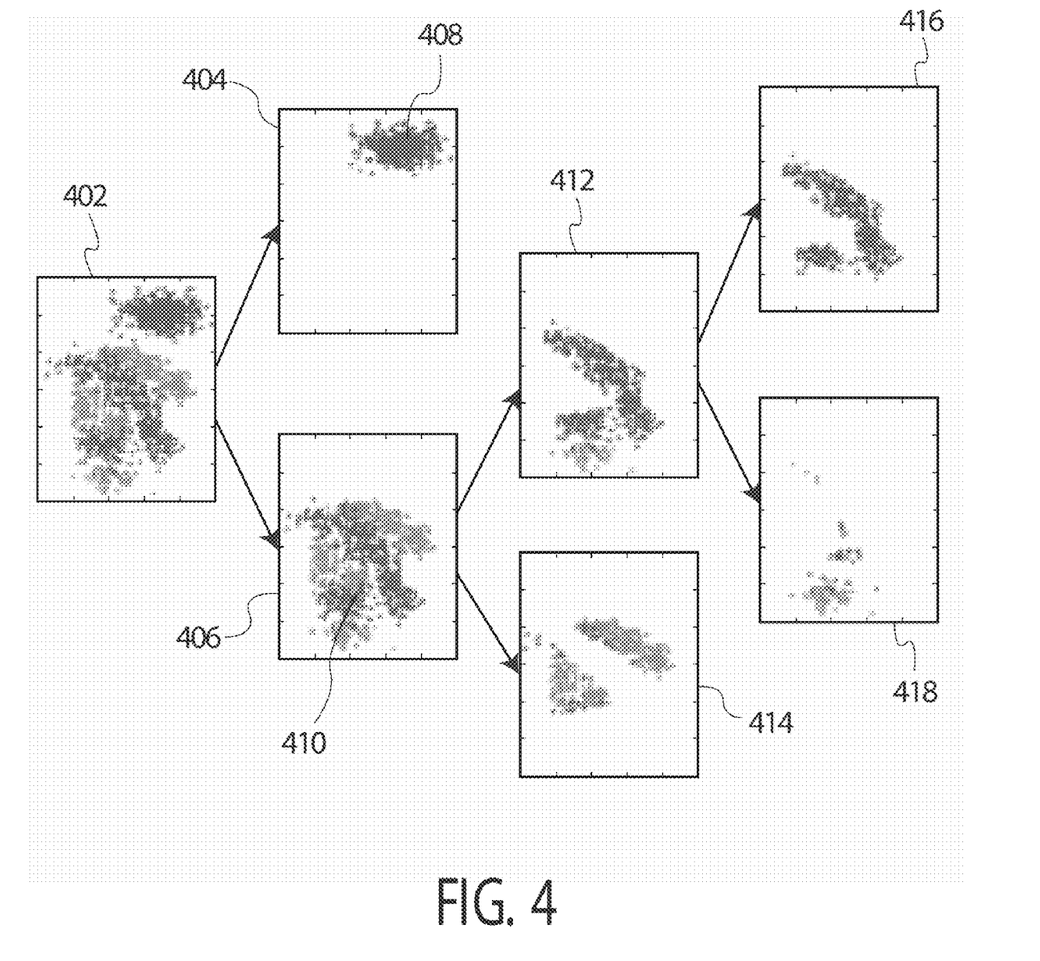
FIG. 4 illustrates an example how a probabilistic boosting tree is learned and training samples are divided in accordance with the present invention.

Under this model, positive and negative samples are naturally divided into sub-groups. FIG. 4 shows an example of how a tree is learned and the training samples are divided. Samples which are hard to classify are passed further down leading to the expansion of the tree. Clustering of positives and negatives is naturally performed. One group serves as an auxiliary variable to the other group. Since each tree node is a strong classifier, it can deal with samples with complex distribution. Also, there is no need to pre-specify the number of clusters. The hierarchical structure of the tree allows for reporting of the clusters according to different levels of discrimination.

As shown in FIG. 4 a PBT is created from a synthetic dataset 402 of 2000 points. Weak classifiers are likelihood classifiers on features such as position and distance to 2D lines. The first level of the tree 404, 406 divides the whole set into two parts 408, 410. The one set 408 has mostly dark points since they are away from the rest of the clouds. The tree expands on the parts where positive and negative samples are tangled. The further levels 412-418 expand from set 410 to better separate the dark points and light points from that set.

Figure 5:
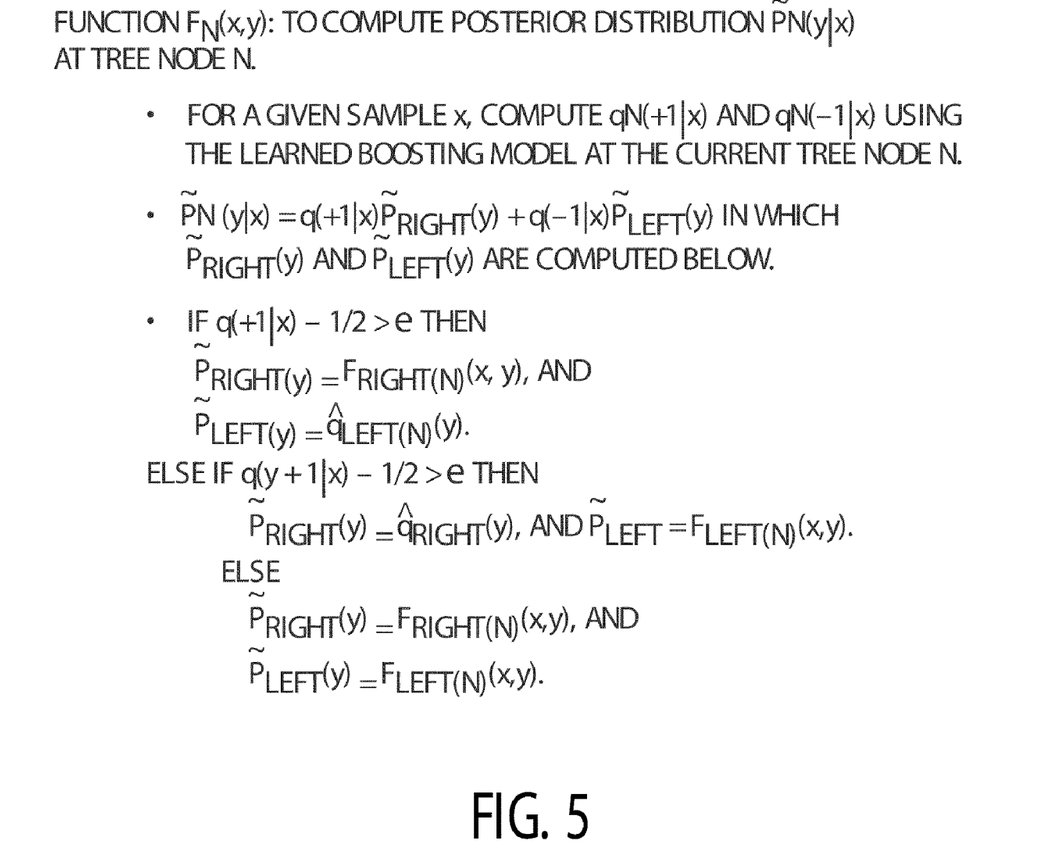
FIG. 5 outlines a method for testing a probabilistic boosting tree in accordance with the present invention.

The testing stage is consistent with the training stage. FIG. 5 provides the details for computing the approximated posterior probability $\tilde{p}(y|x)$. At the root of the tree, the information from the descendants is gathered, and an overall approximated posterior distribution is reported. This approach can also be turned into a classifier which makes hard decisions. After computing $q(+1|x)$ and $q(-1|x)$, a decision can be made to go into the right or left sub-trees by comparing $q(+1|x)$ and $q(-1|x)$. The empirical distribution $\hat{q}(y)$ contained at the leaf node of the tree is then passed back to the root node of the tree. However, the advantage of using probability is obvious. Once a PBT is trained, the $\tilde{p}(y|x)$ can be used as a threshold to balance between precision and recall.

Figure 6:
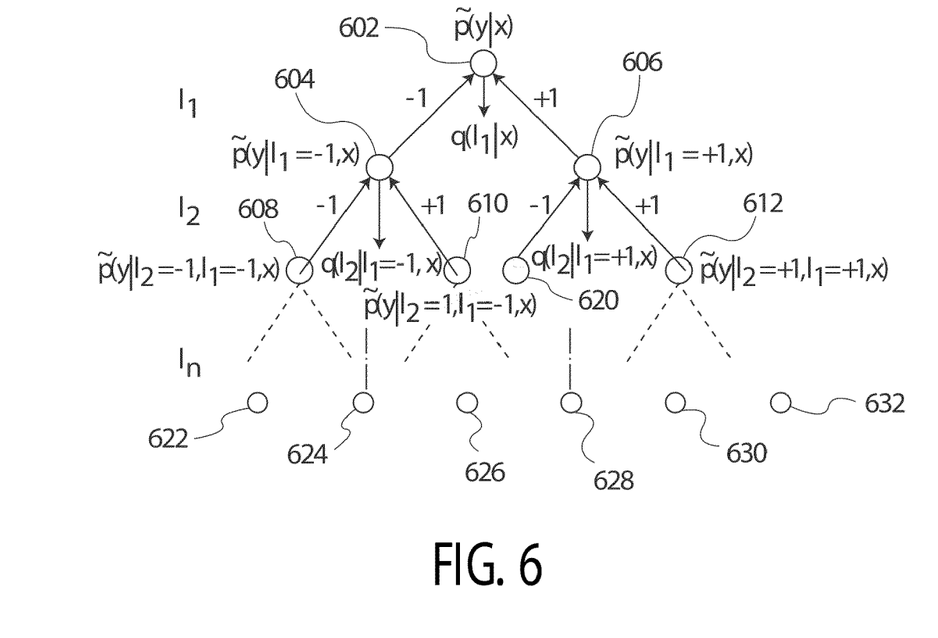
FIG. 6 illustrates an example of a probabilistic model of a tree in accordance with the present invention.

FIG. 6 illustrates an example of a probabilistic model of a tree in accordance with the present invention. Each tree node 602-612 is a strong classifier. The dark nodes 620-632 represent leaf nodes. A complex pattern x is generated by a generation process which has a set of hidden variables. PBT can be viewed as having a similar aspect by doing implicit data augmentation. The goal of the learning method is to learn the posterior distribution $p(y|x)$. Each tree level $l_i$ is an augmented variable.

$$\tilde{p}(y \mid x) = \sum_{l_i} \tilde{p}(y \mid l_1, x) q(l_1 \mid x) \quad (4)$$

$$= \sum_{l_1, l_2} \tilde{p}(y \mid l_2, l_1, x) q(l_2 \mid l_1, x) q(l_1 \mid x)$$

$$= \sum_{l_1, \ldots, l_n} \tilde{p}(y \mid l_n, \ldots, l_1, x) \ldots q(l_2 \mid l_1, x) q(l_1 \mid x)$$

At a tree node, if the exact model can be learned, then $$\tilde{p}(y \mid l_i, \ldots l_1, x) = \sum_{l_{i+1}} \delta(y = l_{i+1}) q(l_{i+1} \mid l_i, \ldots l_1, x), \quad (5)$$

which means the model $q(l_{i+1}|l_1, \ldots l_1, x)$ perfectly predicts the y and, thus, the tree stops expanding. The augmented variables $l_i$ gradually decouples y from x to make a better prediction.

A two class boosting tree approach has been described. Traditional boosting approaches for multi-class classification require multi-class weak classifiers, which are in general much more computationally expensive to learn and compute than two class weak classifiers. This is especially a problem when the number of classes becomes large. Interestingly, different classes of patterns are often similar to each other in a certain aspect. For example, a donkey may look like a horse from a distance.

Figure 7:
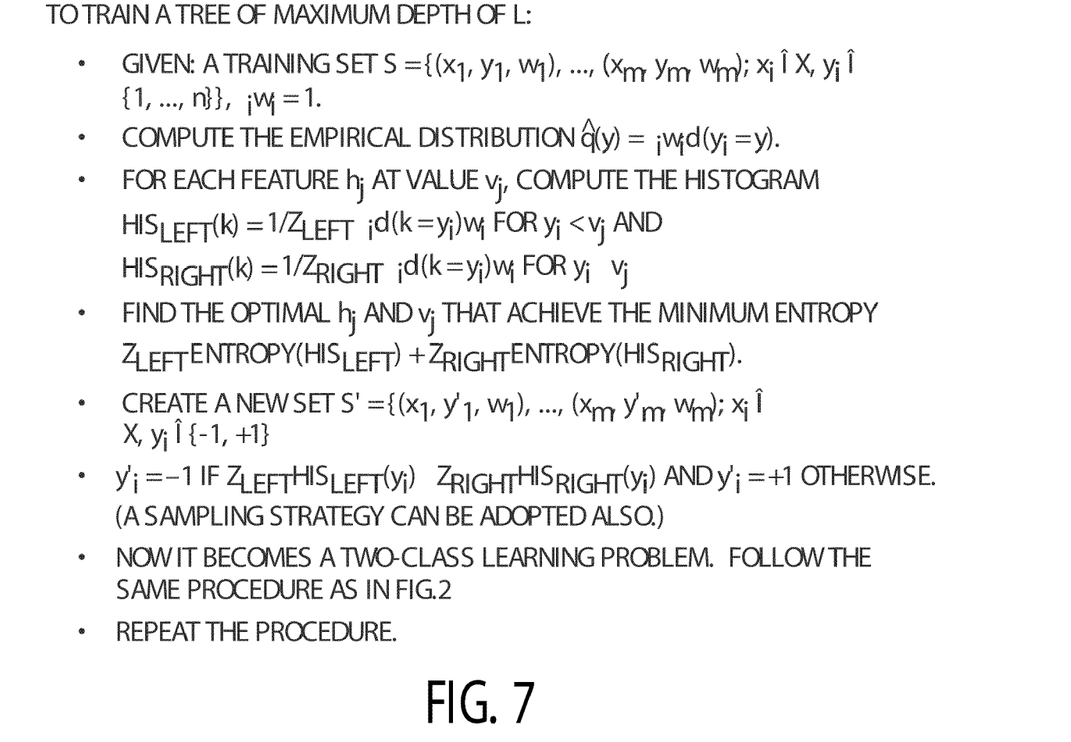
FIG. 7 outlines a method for training a multi-class probabilistic boosting tree in accordance with the present invention.

FIG. 7 outlines a method for training a multi-class boosting tree in accordance with the present invention. The method first finds the optimal feature that divides the multi-class patterns into 2 classes and then uses the previous two class boosting tree method to learn the classifiers. In many instances, the first feature selected by the boosting method after transforming the multi-class into two classes is often the one chosen for splitting the multi-classes. Intuitively, the rest of the features/weak classifiers picked are supporting the first one to make a stronger decision. Thus, the two class classification problem is a special case of the multi-class classification problem. Similar objects of different classes, according to the features, are grouped against the others. As the tree expansion continues, they are gradually clustered and set apart. The expansion stops when each class has been successfully separated or there are too few training samples.

The testing procedure for a multi-class PBT is nearly the same as that in the two class problem. Again, the top node of the tree integrates all the probabilities from its sub-trees, and outputs an overall posterior probability. The scale of the problem is $O(\log(n))$ with respect to the number of classes, n. This multi-class PBT is very efficient in computing the probability due to the hierarchical structure. This is important when we want to recognize hundreds or even thousands of classes of objects, which is the problem human vision systems are dealing with every day. In the worst case, each tree node may be traversed. However, this is rarely the case in practice.

Figure 8:
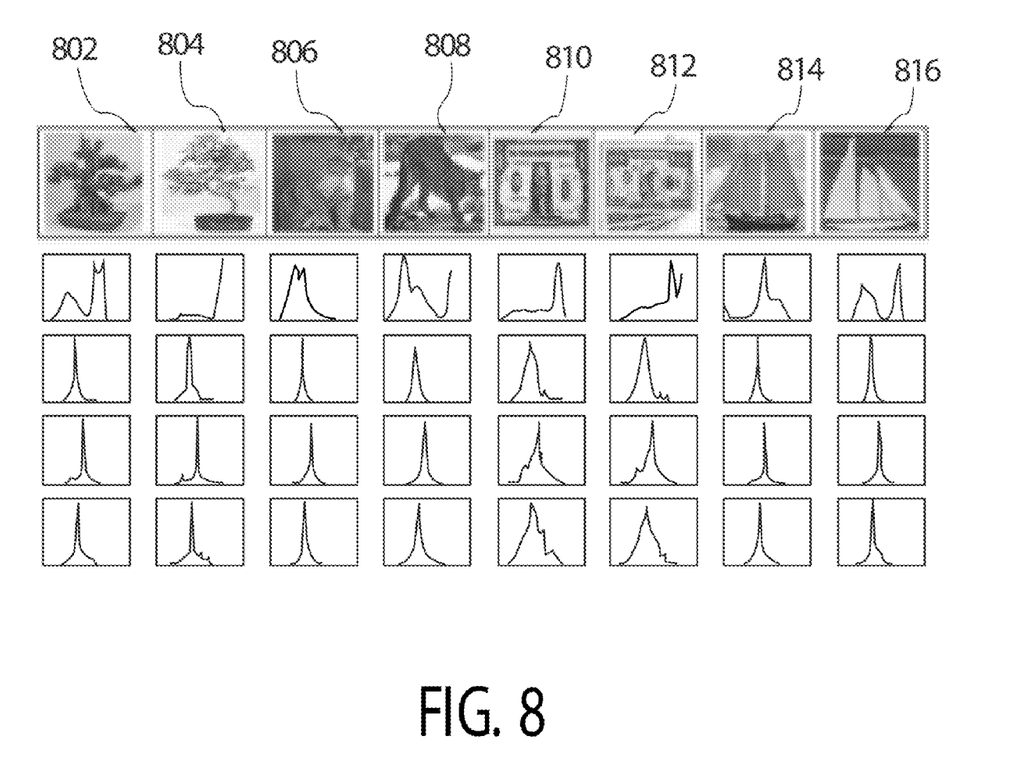
FIG. 8 illustrates histograms of four object images in intensity and three Gabor filtering results in accordance with the present invention.

The multi-class probabilistic boosting tree can be used for object categorization in accordance with the present invention. An example will now be described. FIG. 8 illustrates histograms of four object images on intensity and three Gabor filtering results. The images shown represent four categories: bonsai 802, 804, cougar body 806, 808, dollar bill 810, 812, and ketch 814, 816. Histograms are shown to be robust against translation and rotation and have good discriminative power. Histograms on different filter responses of an image serve as different cues, which can be used and combined to perform scene analysis and object recognition. To learn discriminative models, up to the $3^{rd}$ order moments are computed for each histogram $h(s)$ to make use of integral image for fast computing.

The goal is to learn a discriminative model so that it outputs the posterior distribution on the category label for each input image patch. Each object image is resized into an 80×80 patch. For each image patch, the edge maps are computed using a Canny edge detector at three scales orientation of the edges and filtering results by 10 Gabor filters. These are the cue images for the image patch. One thousand rectangles with different aspect ratios and sizes centered at various locations are put in the 80×80 image patch. Features are the moments of the histogram for each rectangle on every cue image. The multi-class PBT then picks and combines these features forming hierarchical classifiers.

Figure 9:
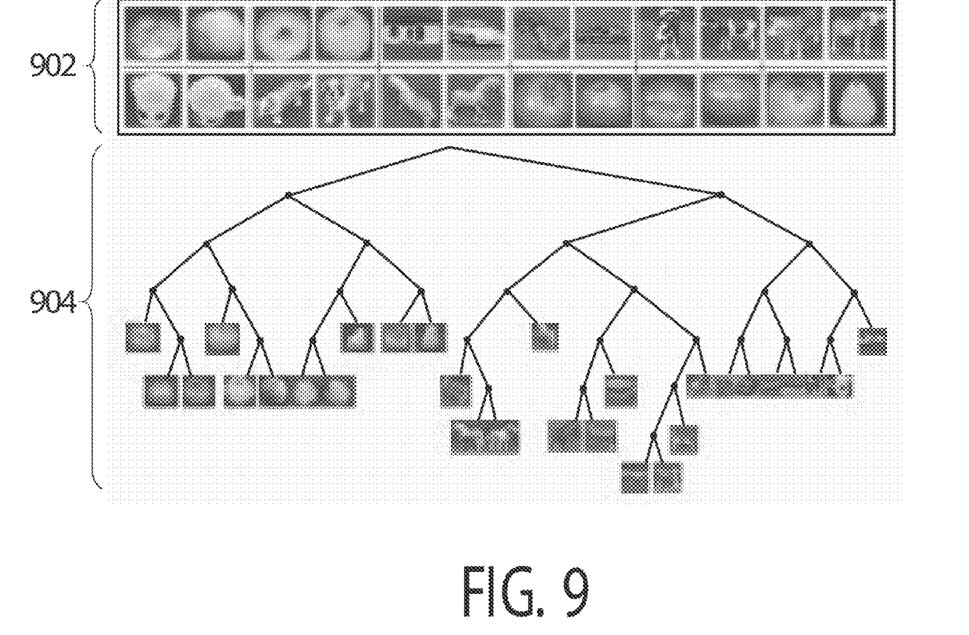
FIG. 9 illustrates some sample images from an image set and the clusters learned in accordance with the present invention.

For purposes of explanation, 29 out of a total of 80 categories are picked in the image dataset. There are 41 images for each category and some of them are shown in FIG. 9. The images are taken for objects at different view directions and illuminations. Next, 25 images are randomly picked out of each category for training. FIG. 9 shows the sample images 902 and clusters 904 formed in the boosting tree after learning. The approach of the present invention is capable of automatically discovering the intra-class similarity and inter-class similarity and dis-similarity. For the images not picked in training, the recognition/categorization rate is tested. The one with the highest probability is considered as correct recognition. Table 1 below shows the recognition rate on the remaining 16 images for each category. The average recognition rate is 76%.

TABLE 1

| apple1 | 100% | cup1 | 100% | tomato3 | 100% | horse1 | 94% |
| pear10 | 94% | apple4 | 94% | pear3 | 94% | pear9 | 94% |
| cup4 | 88% | cow1 | 88% | pear8 | 88% | dog2 | 81% |
| car1 | 81% | pear1 | 81% | apple3 | 75% | car9 | 75% |
| tomato1 | 75% | tomato10 | 75% | horse3 | 75% | cup9 | 75% |
| dog10 | 69% | dog1 | 69% | horse8 | 69% | car11 | 56% |
| car11 | 56% | cow2 | 50% | cow10 | 44% | horse10 | 44% |
| cow8 | 0.19 | | | | | | |

Figure 10:
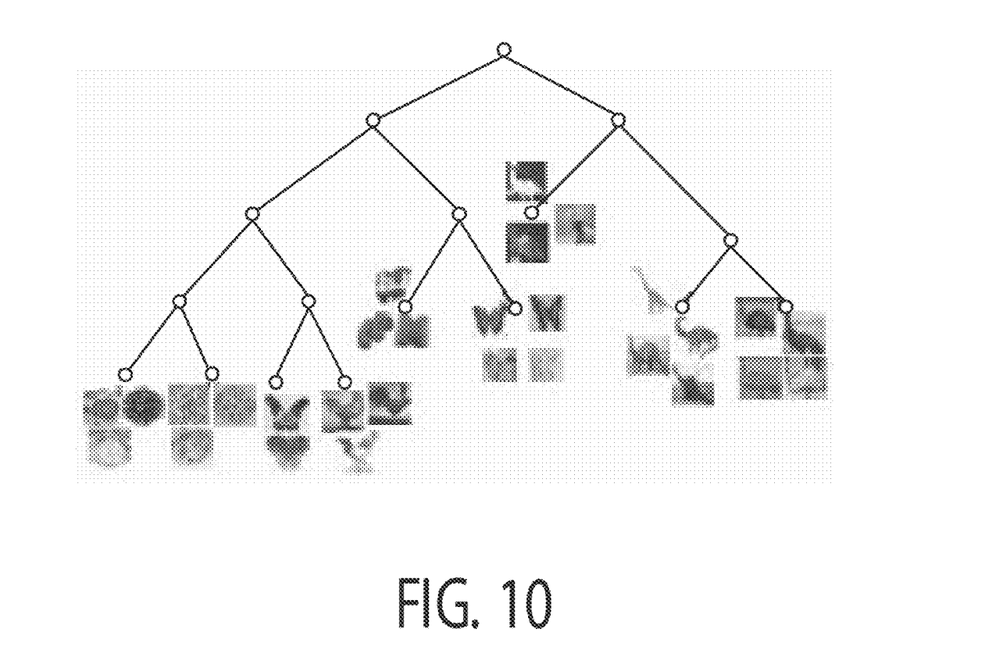
FIG. 10 illustrates some sample image clusters that were formed in accordance with the present invention.

In the next example, a more complicated image set is used which is known as the Caltech-101 image categories. Some of the typical images are shown in FIG. 1. Instead of working on the original images, all of the images were cropped and resized to 80×80. Learning and testing are performed based on the cropped image. Next, 25 images are randomly selected from each category for training. FIG. 10 shows some of the clusters formed after training. However, the clusters are sparser than the ones in the other image set described above due to complex object categories. For each category $y_j$, the histogram is computed $$h(N) = \sum_i \delta(N - N(x_i)) \quad (6)$$

where N is a leaf node and $N(x_i)$ is the leaf node at which training sample $x_i$ is finally located. The entropy of $h(N)$ tells how tight the samples of each category are in the tree. For objects which are similar to each other in the category, tight clusters should be formed. Objects having large variation are more scattered among the tree. In Table 2 shown below, the third column after the category name gives the entropy measure for each category.

TABLE 2

| object | r1 | r2 | entropy | object | r1 | r2 | epy |
| --- | --- | --- | --- | --- | --- | --- | --- |
| inline skate | 100% | 100% | 0.39 | garfield | 100% | 100% | 1.26 |
| yin yang | 83% | 83% | 0.52 | stop sign | 66% | 81% | 1.09 |

TABLE 2-continued

| object | r1 | r2 | entropy | object | r1 | r2 | epy |
|---|---|---|---|---|---|---|---|
| revolver | 63% | 80% | 1.16 | metronome | 63% | 75% | 1.26 |
| dollar bill | 61% | 78% | 0.80 | motorbikes | 56% | 75% | 0.52 |
| joshua tree | 0% | 19% | 1.19 | beaver | 0% | 25% | 1.36 |
| chair | 0% | 9% | 1.75 | wild cat | 0% | 22% | 1.56 |
| crab | 0% | 0% | 1.92 | background | | | 2.82 |

Object categories like "ying yang" have very low entropy and, not surprisingly, the background category has the most variability and the highest entropy. This entropy measure loosely indicates how difficult it will be to recognize each category. The categorization/recognition result is shown in Table 2. The first column after the category name, r1, is the recognition rate when the discriminative model outputs its category id as the one with the highest probability. The average recognition rate for r1 is 20%. A random guess would get a rate around 1%. The second column, r2, is the categorization rate when the category id is among the top ten choices. The average rate for r2 is 40%.

The present invention can be used for both object detection and classification. Some examples of applications for which PBT would be beneficial include multi-view face detection, localization of the left ventricle and fetal measurements (e.g., fetal head, abdomen, and femur). The present invention can then further be used to classify the detected objects. For example, in the case of the left ventricle, the left ventricle can be classified as long vs. round. In the case of fetal measurements, the head measurements can be separated from the abdomen measurements.

Figure 11:
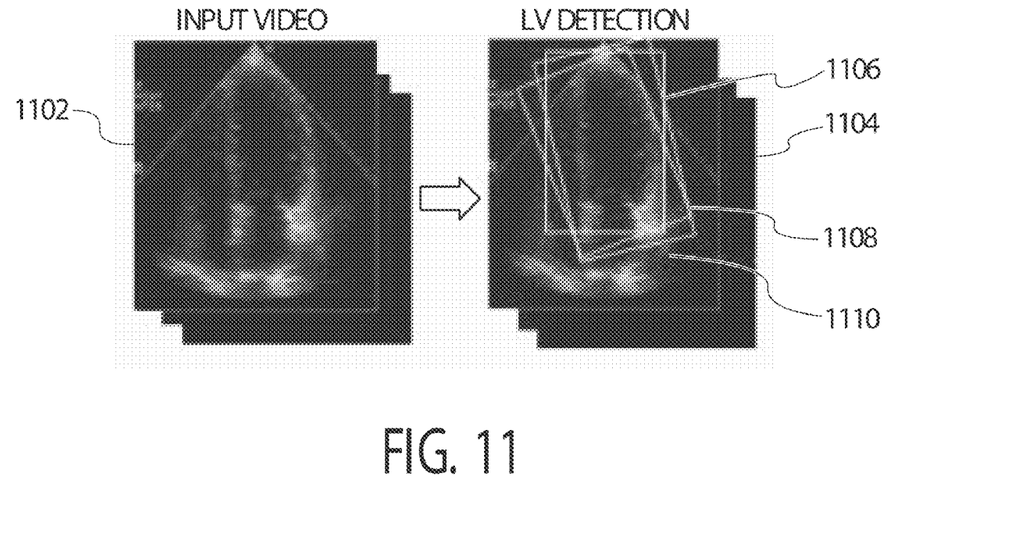
FIG. 11 illustrates a still image from an input video of a heart and the resulting left ventricle detection in accordance with the present invention.
Figure 12:
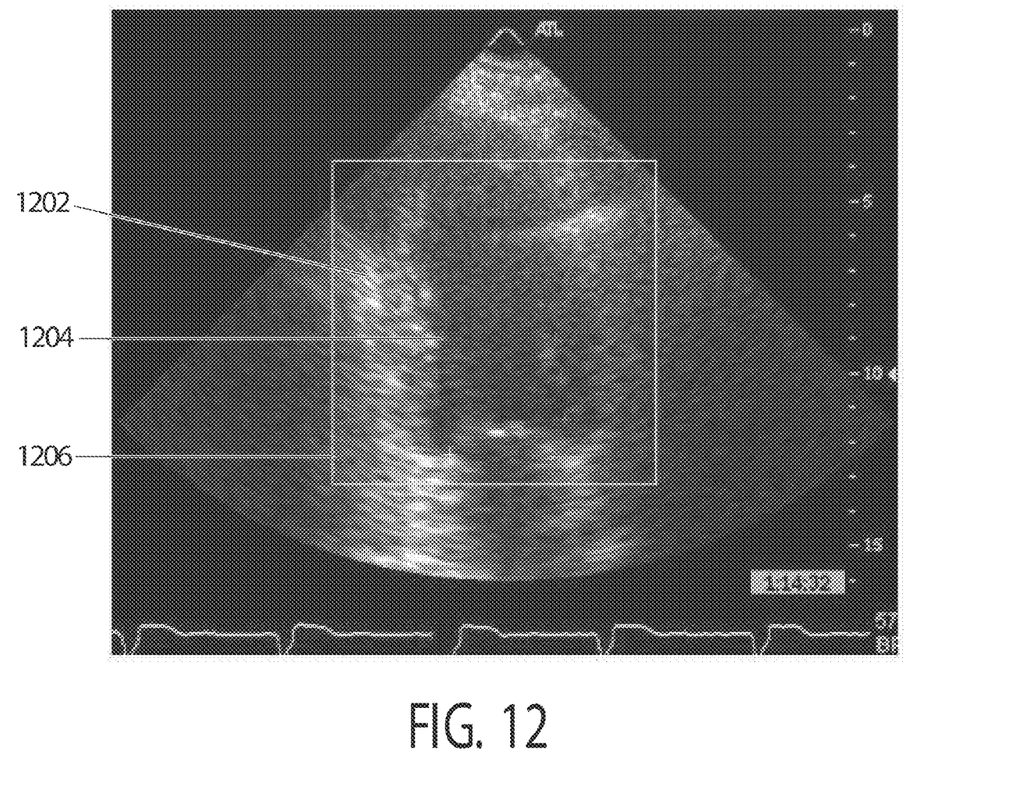
FIG. 12 shows an example of left ventricle localization in an ultrasound image in accordance with the present invention.

The PBT is trained on a training set containing approximately 2,000 aligned positive samples, and 90,000 negative samples, all of the same size. The negatives contain also shifted copies of the positive samples, for better localization. FIG. 11 illustrates a series of still images 1102 that represent an input video of a heart and the resulting images 1104 in which the left ventricle is detected in accordance with the present invention. For detection, the left ventricle is searched in the input image 1102 at different locations, rotation angles, scales and aspect ratios using a coarse-to fine strategy. Each search location, rotation, scale and aspect ratio corresponds to a not necessarily horizontal bounding box in which the left ventricle should reside. Examples of bounding boxes include 1106-1110. The trained PBT will give a probability for each such box, and the box with the highest probability is selected as the location, size and orientation of the left ventricle. An example of a localization of a left ventricle 1202 is shown in FIG. 12. The "+s" indicate the location of the endocardial wall 1204. The bounding box 1206 represents the location of the left ventricle.

Figure 13:
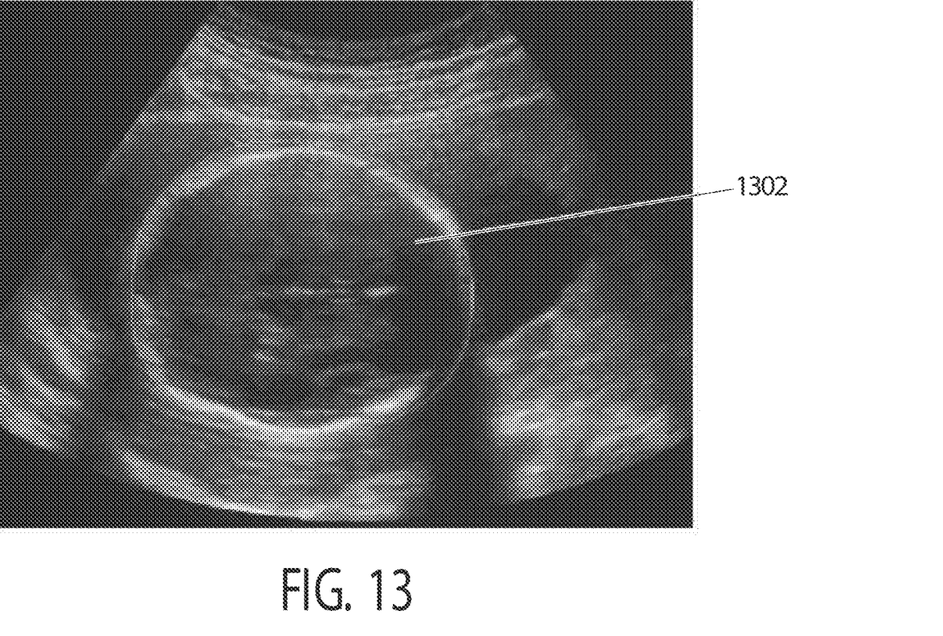
FIG. 13 shows an example of fetal head localization in an ultrasound image in accordance with the present invention.
Figure 14:
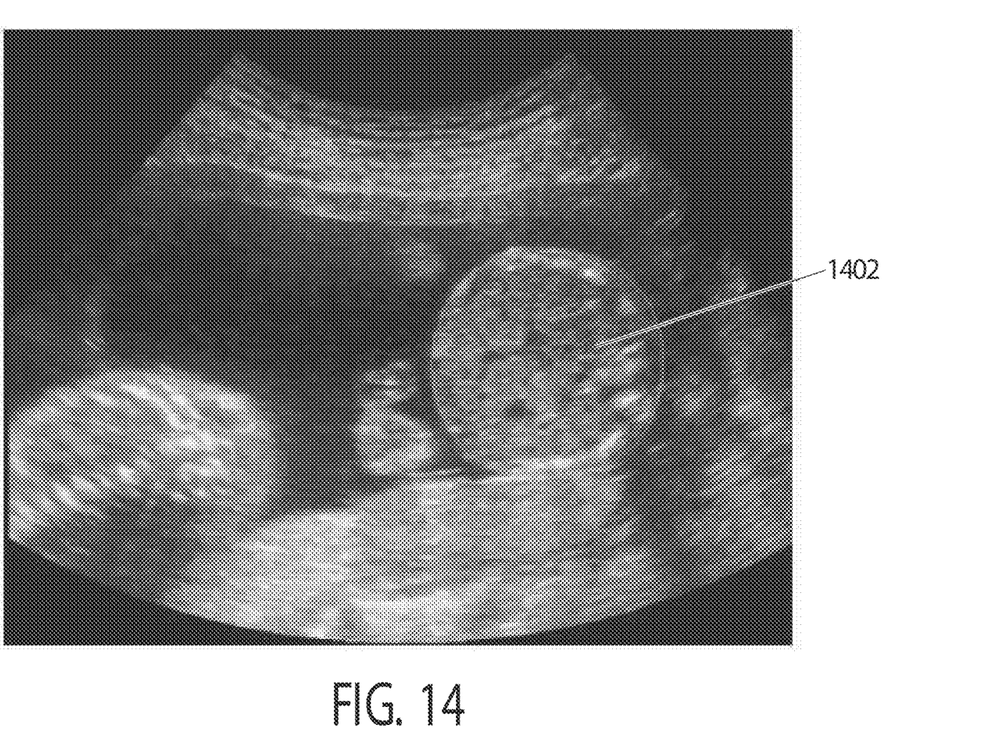
FIG. 14 shows an example of fetal abdomen localization in an ultrasound image in accordance with the present invention.
Figure 15:
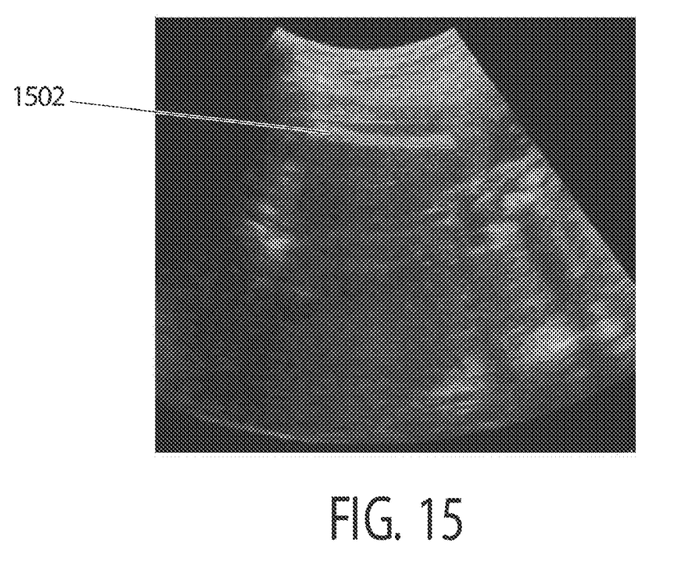
FIG. 15 shows an example of fetal femur localization in an ultrasound image in accordance with the present invention.

The same strategy is used for the localization of the fetal head, abdomen and femur from ultrasound data. FIGS. 13-15 show examples of localization of the fetal head 1302, fetal abdomen 1402 and femur 1502 in accordance with the present invention. As with the left ventricle, the fetal head, abdomen or femur is searched in the input image at different locations, rotation angles, scales and aspect ratios using a coarse-to-fine strategy. Each search location, rotation, scale and aspect ratio corresponds to a bounding box in which the head, abdomen or femur should reside. The trained PBT will give a probability for each such box, and the box with the highest priority is selected as the location, size and orientation of the head, abdomen or femur.

Figure 16:
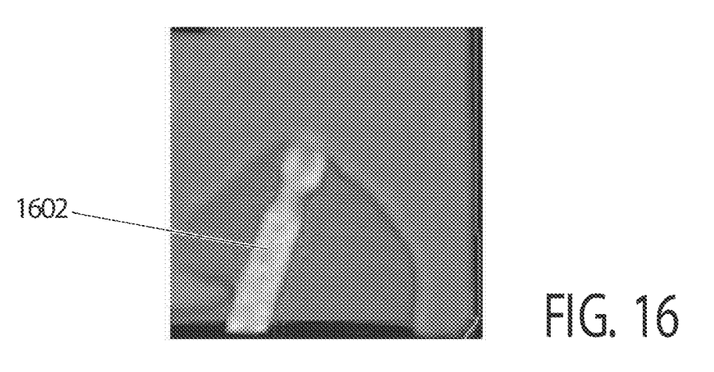
FIG. 16 shows an example of rectal tube detection in computed tomography image in accordance with the present invention.
Figure 17:
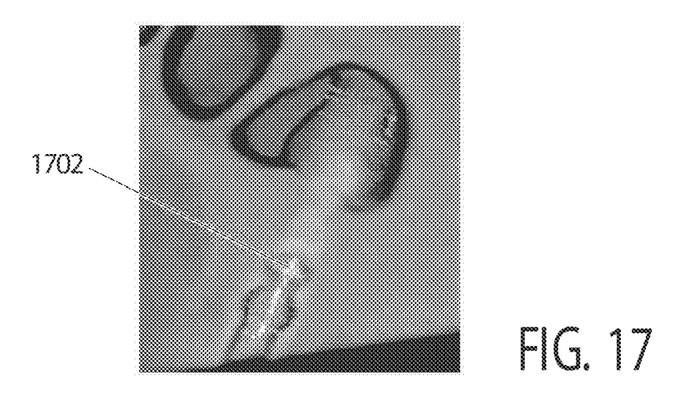
FIG. 17 shows an enlarged view of the rectal tube of FIG. 16 in accordance with the present invention.

The PBT can also be used for Rectal Tube detection from CT volumetric data. An example will now be described with reference to FIGS. 16 and 17. A set of 7000 features invariant to axial rotation, based on gradient and curvature, was used for training. The training set contained approx 20000 tube segments as positive examples and 250000 negative examples.

Typically the search for the tubes in the 3D data would involve a search for many locations, 3D directions and sizes of the tube, which is computationally prohibitive. Instead, a tensor voting strategy is used to propose 3D locations, directions and radii of the tube candidates. The trained PBT classifier is computed for each of the tube candidates, and those whose probability is larger than a threshold are selected as detected tubes as shown by tubes 1602 and 1702 in FIGS. 16 and 17.

Figure 18:
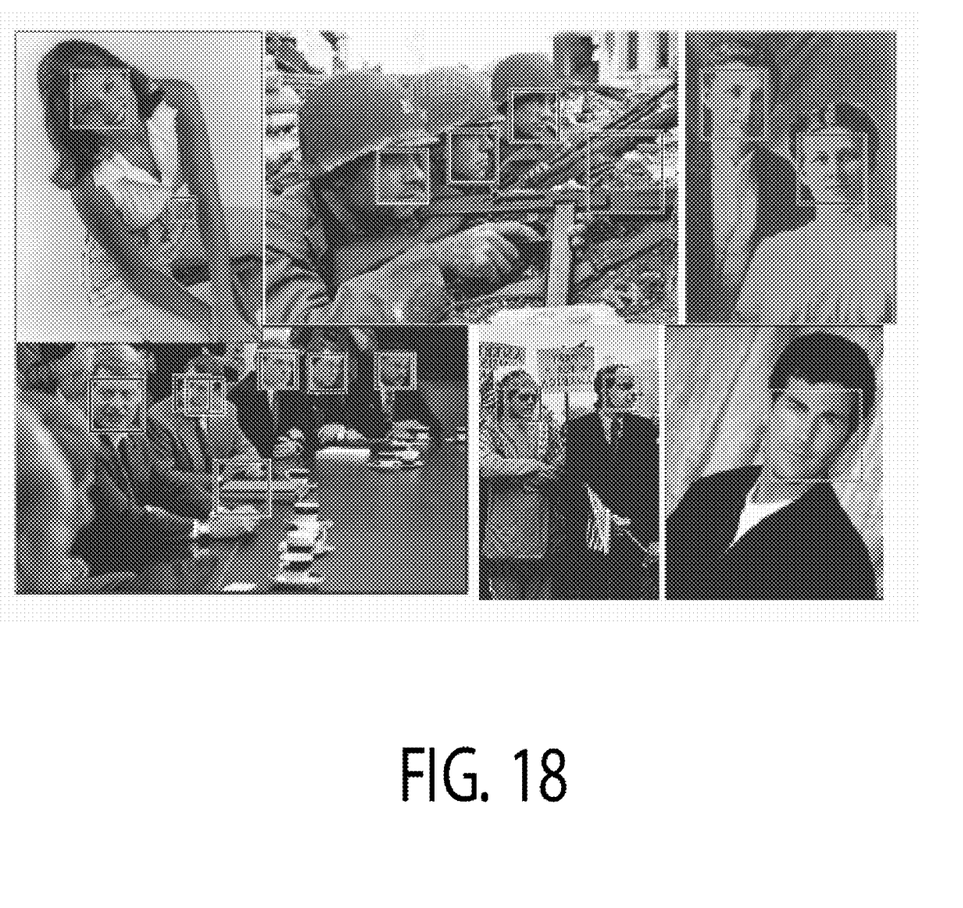

As indicated above, the present invention can also be used for multi-view face detection. The trained PBT provides different examples of facial views. FIG. 18 shows some examples of facial detection results tested on a frontal and profile image set.

Having described embodiments for a method for computing multi-class discriminative models using a probabilistic boosting tree framework, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method of classifying an image of objects into different image categories comprising the steps of:
   recursively constructing a probabilistic boosting tree in which each tree node is a strong classifier, a discriminative model being obtained at the top of the tree and each level of the tree comprising an augmented variable;
   dividing an input training set into two new sets according to a learned classifier defined by an optimal feature for dividing the input training set; using the two new sets to train a left and right sub-trees recursively, wherein clustering is automatically formed in a hierarchical way;
   calculating a probability that the image falls within a left sub-tree of the top of the tree and calculating a probability that the image falls within a right sub-tree of the top of the tree by recursively determining left and right sub-tree probabilities at each level of the tree; and
   outputting the likelihood that the image matches the left sub-tree of the top of the tree and the likelihood that the image matches the right sub-tree of the top of the tree based on the calculated probabilities,
   wherein each of the method steps are performed within an image processing apparatus or device.

2. The method of claim 1 wherein the probabilistic tree solves a two class problem.

3. The method of claim 1 wherein the step of outputting an appropriate number of classifications comprises a positive class and a negative class.

4. The method of claim 1 wherein the probabilistic tree solves a multi-class problem.

5. The method of claim 4 wherein the step of outputting an appropriate number of classifications comprises multiple categories of a predetermined number.

6. The method of claim 1 wherein the object is an anatomical structure.

7. The method of claim 6 wherein the anatomical structure is a left ventricle.

8. The method of claim 6 wherein the anatomical structure is a fetus head.

9. The method of claim 6 wherein the anatomical structure is a fetus abdomen.

10. The method of claim 6 wherein the anatomical structure is a fetus femur.

11. The method of claim 6 wherein the anatomical structure is a face.

12. The method of claim 6 wherein the anatomical structure is a rectal tube.

* * * * *